United States Patent [19]
Takahashi

[11] Patent Number: 6,147,338
[45] Date of Patent: *Nov. 14, 2000

[54] PHOTOELECTRIC CONVERTING APPARATUS WITH GAIN-ADJUSTABLE AMPLIFICATION

[75] Inventor: Hidekazu Takahashi, Isehara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/996,318

[22] Filed: Dec. 22, 1997

[30] Foreign Application Priority Data

Dec. 24, 1996 [JP] Japan ................................. 8-343150

[51] Int. Cl.[7] .............................. H04N 3/14; H04N 5/335

[52] U.S. Cl. ........................................ 250/208.1; 348/308

[58] Field of Search ......................... 250/208.1; 348/300, 348/310, 294; 257/231

[56] References Cited

U.S. PATENT DOCUMENTS

| | | | |
|---|---|---|---|
| 5,698,844 | 12/1997 | Shinohara et al. | 250/214 R |
| 5,717,458 | 2/1998 | Yonemoto | 250/208.1 |
| 5,861,620 | 1/1999 | Takahashi et al. | 348/308 |

FOREIGN PATENT DOCUMENTS

| | | |
|---|---|---|
| 0665685 | 8/1995 | European Pat. Off. . |
| 0757475 | 2/1997 | European Pat. Off. . |

*Primary Examiner*—Stephone B. Allen
*Attorney, Agent, or Firm*—Fitzpatrick, Cella, Harper & Scinto

[57] ABSTRACT

In an amplification photoelectric conversion apparatus which amplifies charges generated in a photoelectric conversion area by inverting amplification and outputs the charges to an output line, two or more load MOS transistors having different sizes for setting the gain are arranged on each output line, and control is performed by applying a pulse to the gate of the load MOS transistor. In the photoelectric conversion apparatus, a pixel in the photoelectric conversion area is constituted only by a photodiode and a MOS transistor. The photoelectric conversion apparatus incorporates a memory cell constituted by a MOS transistor and a capacitor.

29 Claims, 8 Drawing Sheets

FIG. 1

FIG. 2A A LOT OUTPUT WAVEFORM

FIG. 2B B LOT OUTPUT WAVEFORM

FIG. 3A A LOT OUTPUT WAVEFORM

FIG. 3B B LOT OUTPUT WAVEFORM

PHOTOELECTRIC CONVERTING APPARATUS WITH GAIN-ADJUSTABLE AMPLIFICATION

BACKGROUND OF THE INVENTION

1. Field of the Invention

The present invention relates to a photoelectric conversion apparatus capable of amplifying charges in a photoelectric conversion area of a sensor and changing the gain of the amplification.

2. Related Background Art

An inverting amplification CMOS sensor is one of amplification photoelectric conversion apparatuses for removing noise on chip. Such a photoelectric conversion apparatus is described in, e.g., Japanese Patent Application No. 8-7329 and has an arrangement shown in FIG. 8.

Figure 8:
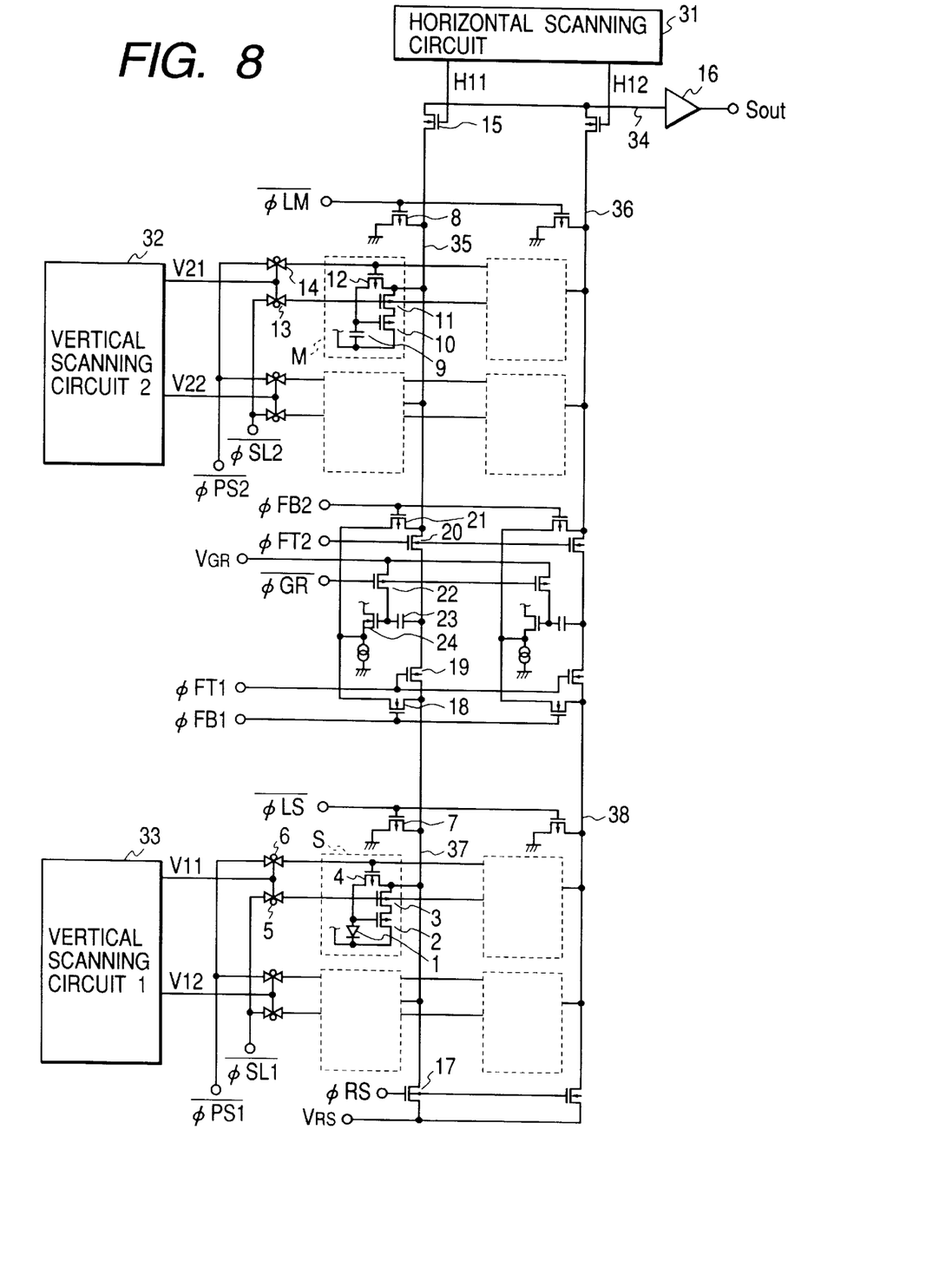
FIG. 8 is a circuit diagram of a related art.

Referring to FIG. 8, a photodiode 1 as a photoelectric conversion device, an amplification MOS transistor 2 for performing inverting amplification, a selection switch MOS transistor 3, and a reset MOS transistor 4 constitute a photoelectric conversion sensor cell S. A storage MOS transistor 9, an amplification MOS transistor 10, a selection switch MOS transistor 11, and a reset MOS transistor 12 form a memory cell M. One unit of a transfer system circuit is constituted by a feedback MOS switch 18 for feeding back charges to the sensor cell S, a transfer switch 19 for sending charges to the transfer circuit, a transfer switch 20 for sending charges to the memory cell M, a feedback MOS switch 21 for feeding back charges to the memory cell M, a clamp MOS switch 22, a clamp capacitor 23, and an amplification MOS transistor 24 for a source follower, and this unit is arranged for each line. This apparatus also includes a horizontal transfer MOS switch 15, an output amplifier 16, and a reset MOS transistor 17. Transmission gates 5 and 6 control pulses φSL1 and φPS1, respectively. Transmission gates 13 and 14 control pulses φSL2 and φPS2, respectively.

Figure 9:
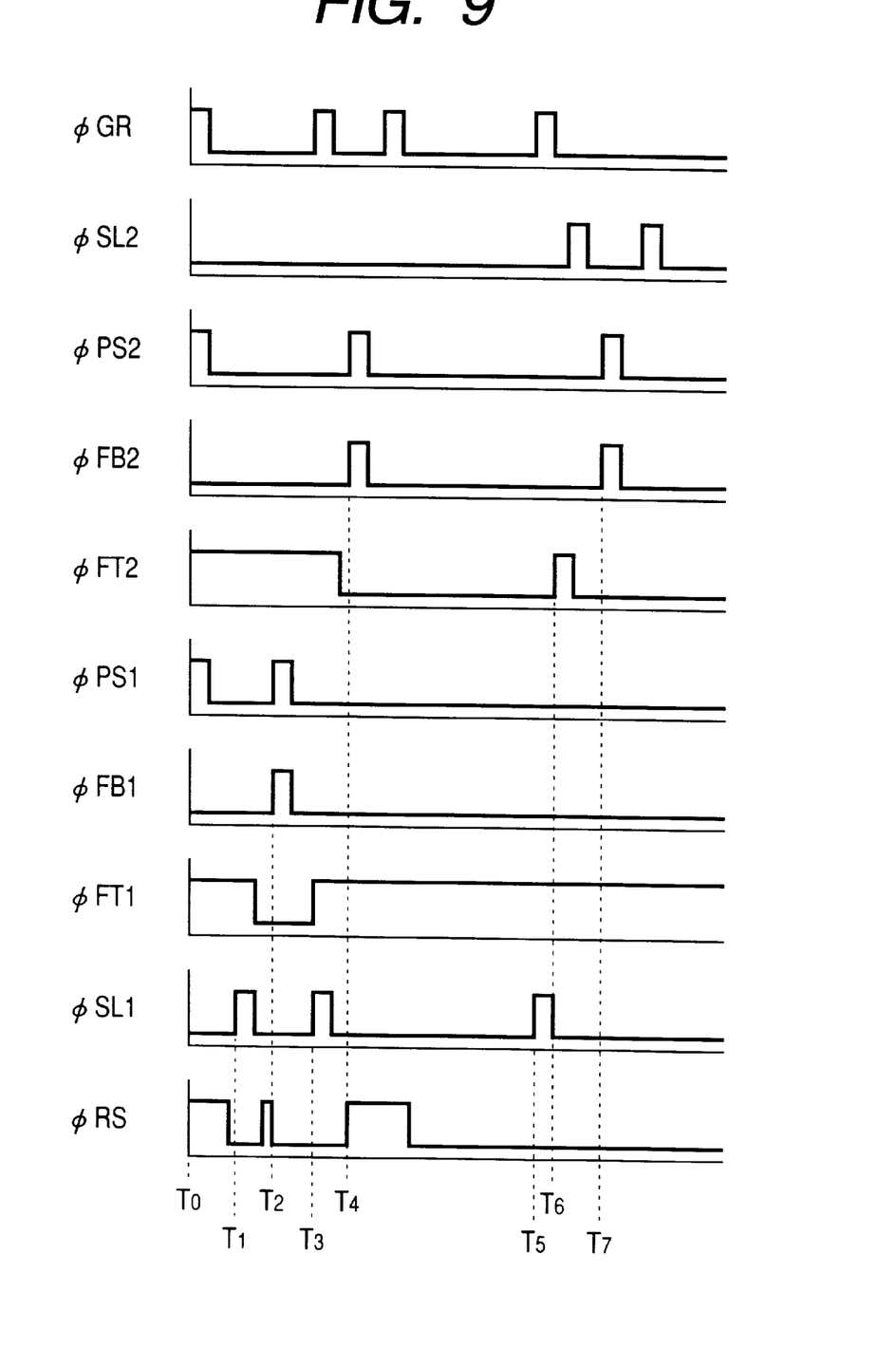
FIG. 9 is a drive timing chart of the related art.

FIG. 9 is a drive timing chart of the photoelectric conversion apparatus. Line outputs V11 and V21 from vertical scanning circuits 1 and 2 are set at "H". At time $T_0$, pulses φRS, φPS1, φFT1, φFT2, and φPS2 are set at "H" to reset the sensor cell S, the memory cell M, and the transfer circuit. At time $T_1$, pulses φSL1 and φLS are set at "H" to turn off a reset MOS transistor 7 and turn on the transmission gate 5, thereby inverting and amplifying the signal from the photodiode 1 as a sensor. The selection switch MOS transistor 3 is turned on to send the signal to the clamp capacitor 23 of the transfer circuit. Thereafter, the transfer pulse φFT1 is set at "H" to turn off the transfer switch 19. The reset pulse φRS is set at "H" to turn on the reset MOS transistor 17, thereby resetting the output line of the sensor cell S. At time $T_2$, the pulses φPS1 and φFB1 are set at "H" to feed back the signal from the transfer circuit to the gate of the amplification MOS transistor 2 of the sensor cell S. At this time, the initial variation (noise) in the sensor cell S is removed due to the antiphase effect between the gain of the inverting amplifier 2 and that of the clamp circuit of the transfer circuit.

In this case, letting $G_S$ be the inverting amplification gain, $G_T$ be the clamp circuit gain, and $N_{init}$ be the initial noise, noise N after the feedback operation is given by:

$$N = N_{init}(1 + G_S \times G_T)$$

The inverting amplification gain that minimizes noise is given by $G_S = -1/G_T$. When the clamp gain is 0.98, the inverting amplification gain can be $-1/0.98 = -1.02$.

At time $T_3$, the signal is sent from the sensor cell S to the transfer circuit again and clamped. At time $T_4$, pulses φFB2 and φPS2 are set at "H" to write a voltage proportional to charges held by the clamp capacitor 23 in the memory cell M.

The above operation is performed for all lines while performing vertical scanning, thereby completing the reset operation. After an arbitrary storage time, the signal is read out from the sensor cell S. At time $T_5$, the pulse φSL1 is set at "H" to invert and amplify the signal and read out the signal from the sensor cell S. At time $T_6$, the pulse φSL2 is set at "H" to read out an initial signal stored in the memory cell M and obtain a voltage difference from the sensor signal. At time $T_7$, the voltage difference is written in the memory cell M. After that, the horizontal scanning circuit performs scanning and outputs the signal to the vertical output terminal through the amplifier 16. Finally, the noise N becomes:

$$N = N_{init}(1 + G_M \times G_T)$$

When the inverting gain of the memory unit is $G_M = -1/G_T$, the noise is minimized. The gain of the inverting amplifier 10 depends on the ratio of a conductance gm of the amplification MOS transistor 10 to a conductance gm' of the load MOS transistor 11. For this reason, when a gate length L or a gate width W of a load MOS transistor 8 is changed to change the conductance gm', the inverting amplification gain can be set to minimize the noise component. This applies not only to noise reduction by the load MOS transistor 8 of the memory cell M but also to noise reduction by the load MOS transistor 7 of the sensor cell S.

However, in the above-described photoelectric conversion apparatus, small variations in well concentration, oxide film thickness, or processing size among lots, wafers, or chips may change the conductance gm of the MOS transistor, resulting in deviation of the inverting amplification gain from its optimum value. If the gain deviates from the optimum value, the noise correction effect degrades, and the output variation among cells, i.e., so-called FPN (Fixed Pattern Noise) increases. This may increase the ratio of defective chips having noise larger than the prescribed value to result in a low yield.

SUMMARY OF THE INVENTION

It is an object of the present invention to suppress an increase in noise.

It is another object of the present invention to change the signal amplification gain.

In order to achieve the above objects, according to an aspect of the present invention, there is provided a photoelectric conversion apparatus comprising photoelectric conversion means, inverting amplification means for amplifying charges generated in the photoelectric conversion means by inverting amplification and outputting the charges to an output line, and load means capable of switching characteristics and arranged on the output line.

According to another aspect of the present invention, there is provided a photoelectric conversion apparatus comprising photoelectric conversion means, inverting amplification means for amplifying charges generated in the photoelectric conversion means by inverting amplification and outputting the charges to an output line, dark output storage means for storing dark charges generated in the photoelectric conversion means via the output line, signal output storage means for storing signal charges generated in the photoelectric conversion means via the output line, and load means capable of switching characteristics and arranged on the output line.

With the above arrangement, when the inverting amplification gain is always set to be optimum by selecting an appropriate load means, a signal free from noise can be obtained. In addition, an appropriate gain can be set, so a high S/N ratio, high sensitivity, and a wide dynamic range can be obtained.

Other features and advantages of the present invention will be apparent from the following specification and drawings.

DESCRIPTION OF THE PREFERRED EMBODIMENTS

Figure 1:
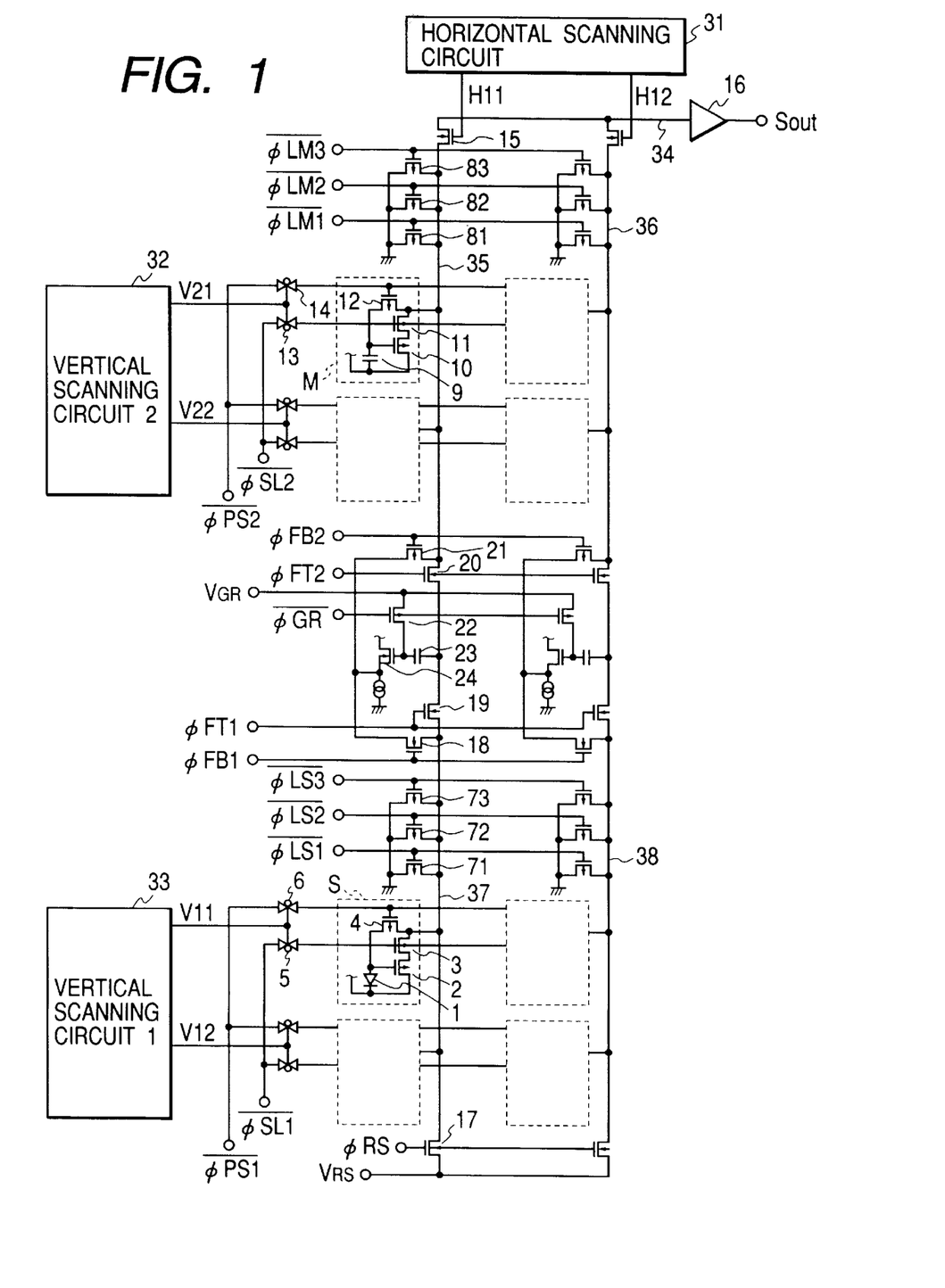
FIG. 1 is a circuit diagram of the first embodiment of the present invention.
Figure 2A:
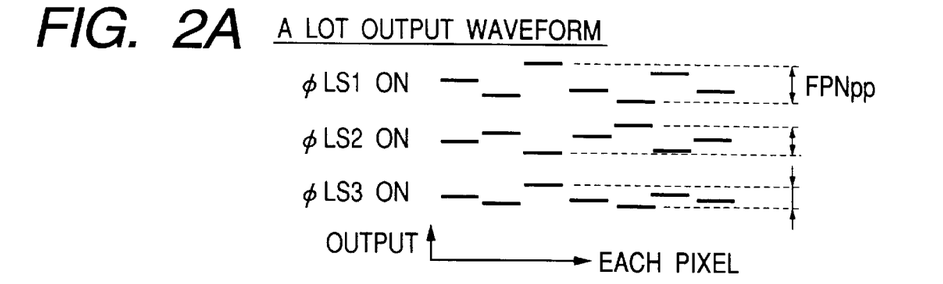
FIGS. 2A and 2B are views showing the output waveforms of a signal from a pixel of a sensor cell of the first embodiment.
Figure 2B:
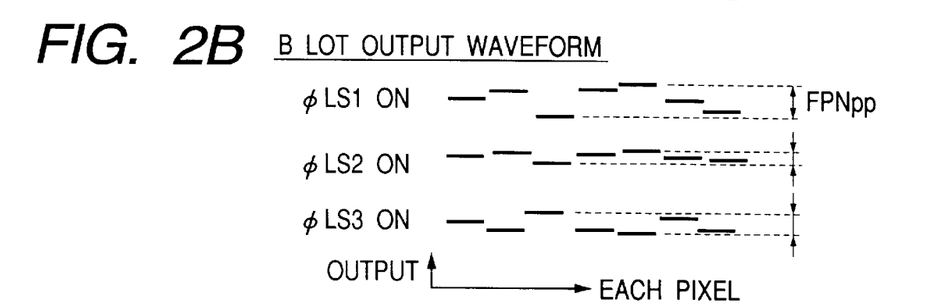
Figure 3A:
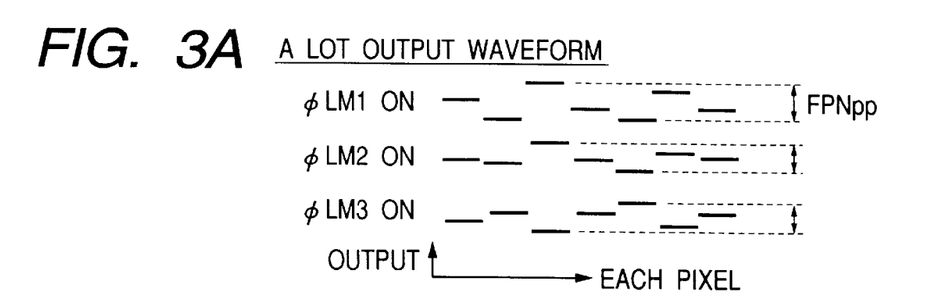
FIGS. 3A and 3B are views showing the output waveforms of the signal from the pixel of the sensor cell of the first embodiment.
Figure 3B:
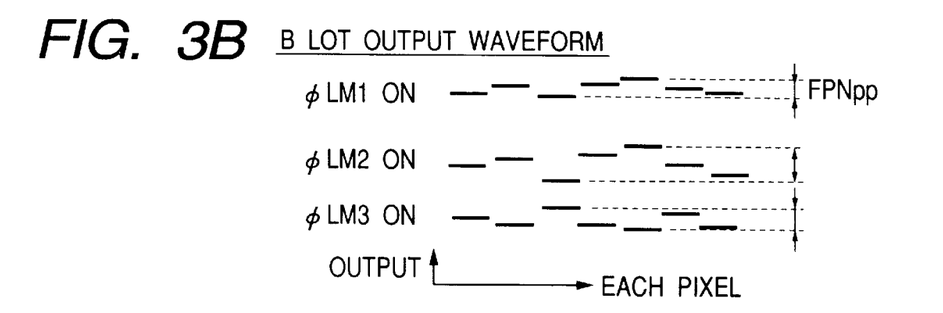

FIG. 1 shows the first embodiment of the present invention. For the descriptive convenience, an area sensor consisting of 2×2 pixels is shown. Referring to FIG. 1, a photodiode 1 as a sensor device, an amplification MOS transistor 2 for performing inverting amplification, a selection switch MOS transistor 3, and a reset MOS transistor 4 make up a photoelectric conversion sensor cell S (to be referred to as a sensor cell S hereinafter). A storage MOS transistor 9, an amplification MOS transistor 10, a selection switch MOS transistor 11, and a reset MOS transistor 12 construct a memory cell M.

One unit of a transfer system circuit, arranged in each column line is constituted by a feedback MOS switch 18 for feeding back charges to the sensor cell S, a transfer switch 19 for transferring charges to the transfer circuit, a transfer switch 20 for transferring charges to the memory cell M, a feedback MOS switch 21 for feedback to the memory cell M, a clamp MOS switch 22 for the transfer circuit, a clamp capacitor 23, and an amplification MOS transistor 24 for a source follower. The photoelectric conversion apparatus also includes a horizontal transfer MOS switch 15 for outputting a signal to an output line 34 when a scanning signal H11 from a horizontal scanning circuit 31 is at "H", an output amplifier 16 for amplifying the signal on the output line 34, and a reset MOS transistor 17 for resetting the residual signal on a sensor output line 37.

Load MOS transistors 71, 72, and 73 for the amplification MOS transistor 2 of the sensor cell S as a photoelectric conversion cell change their conductances gm by changing gate lengths L and gate widths W. This embodiment is characterized in that several load MOS transistors are arranged. Similarly, a plurality of load MOS transistors 81, 82, and 83 having different conductances gm are arranged for the memory cell M. When the variation in conductance gm of a MOS transistor due to process variations is ±5%, the set value of the conductance gm of each MOS transistor is also preferably ±5%. Although load MOS transistors have been described above, the present invention is not limited to this, and any transistor capable of serving as a load resistor can be used.

The operation and timing of the above photoelectric conversion apparatus are basically almost the same as the contents described above with reference to FIG. 8, and a difference will be described below in detail.

FIGS. 2A, 2B, 3A, and 3B show the output waveforms of each pixel in the sensor cell S or memory cell M. In FIGS. 2A, 2B, 3A, and 3B, the abscissa represents each pixel, and the ordinate represents the output voltage of each pixel. $FPN_{PP}$ represents the peak-to-peak value of the output voltage of each pixel. In FIGS. 2A, 2B, 3A, and 3B, adjustment pulses $\phi LS1$, $\phi LS2$, $\phi LS3$, $\phi LM1$, $\phi LM2$, and $\phi LM3$ are driven. Since the amplification MOS transistors 2 and 10 have different gains, the noise removal rates are also different, and this changes the magnitudes of noise. These data are obtained upon inspection using a tester or the like. Of the adjustment pulses $\phi LS1$, $\phi LS2$, $\phi LS3$, $\phi LM1$, $\phi LM2$, and $\phi LM3$, an adjustment pulse for minimizing the noise may be recorded and used in actual use. For example, for lot A shown in FIG. 2A, the adjustment pulse $\phi LS3$ is used. For lot B shown in FIG. 2B, the adjustment pulse $\phi LS2$ is used. For lot A shown in FIG. 3A, the adjustment pulse $\phi LM2$ is used. For lot B shown in FIG. 3B, the adjustment pulse $\phi LM1$ is used. The adjustment pulse can be changed not in units of lots but in units of wafers or chips, as a matter of course.

As described above, when an adjustment pulse for minimizing noise is used, the yield in respect of FPN can be improved. In this embodiment, the three load MOS transistors 71 to 73 and three load MOS transistors 81 to 83 are arranged for the sensor cell S and the memory cell M, respectively. However, the number of load MOS transistors can be two or four or more, as a matter of course. In addition, PMOS transistors or NMOS transistors, or both of them can be used as far as they can serve as load MOS transistors for the amplification MOS transistors 2 and 10.

Figure 4:
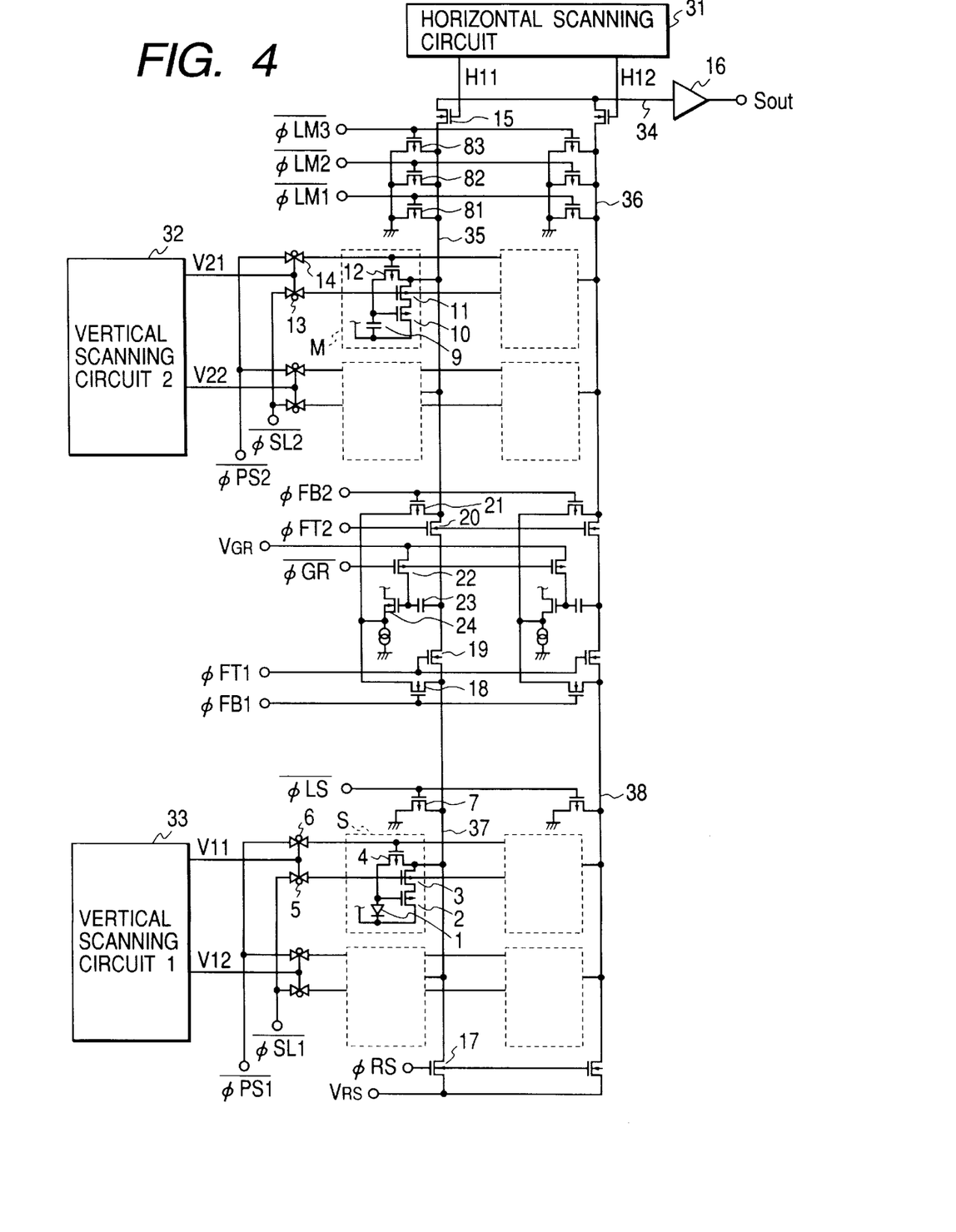
FIG. 4 is a circuit diagram of the second embodiment of the present invention.

FIG. 4 shows the second embodiment of the present invention. In this embodiment, one load MOS transistor is arranged for a sensor cell, as in the prior art, and several load MOS transistors are arranged for a memory cell. When the inverting gain of a memory cell M has an optimum value ($=-1/G_T$), noise in the sensor can be removed. Therefore, this embodiment can be applied to an application which requires only a memory output.

The basic operation of the photoelectric conversion apparatus of this embodiment is the same as that shown in the timing chart of FIG. 9, and a difference will be described below.

In this embodiment, the yield in respect of FPN can be improved without largely increasing the chip size and the number of drive pulses.

The operation is the same as that described with reference to the circuit diagram of FIG. 8 and the contents described in the first embodiment. Adjustment pulses $\phi LM1$ to $\phi LM3$ are applied in the wafer or chip state to determine an adjustment pulse for minimizing FPN. When the photoelectric conversion apparatus is to be activated, the adjustment pulse is set at "L" to operate a specific load MOS transistor for the memory cell M.

Figure 5:
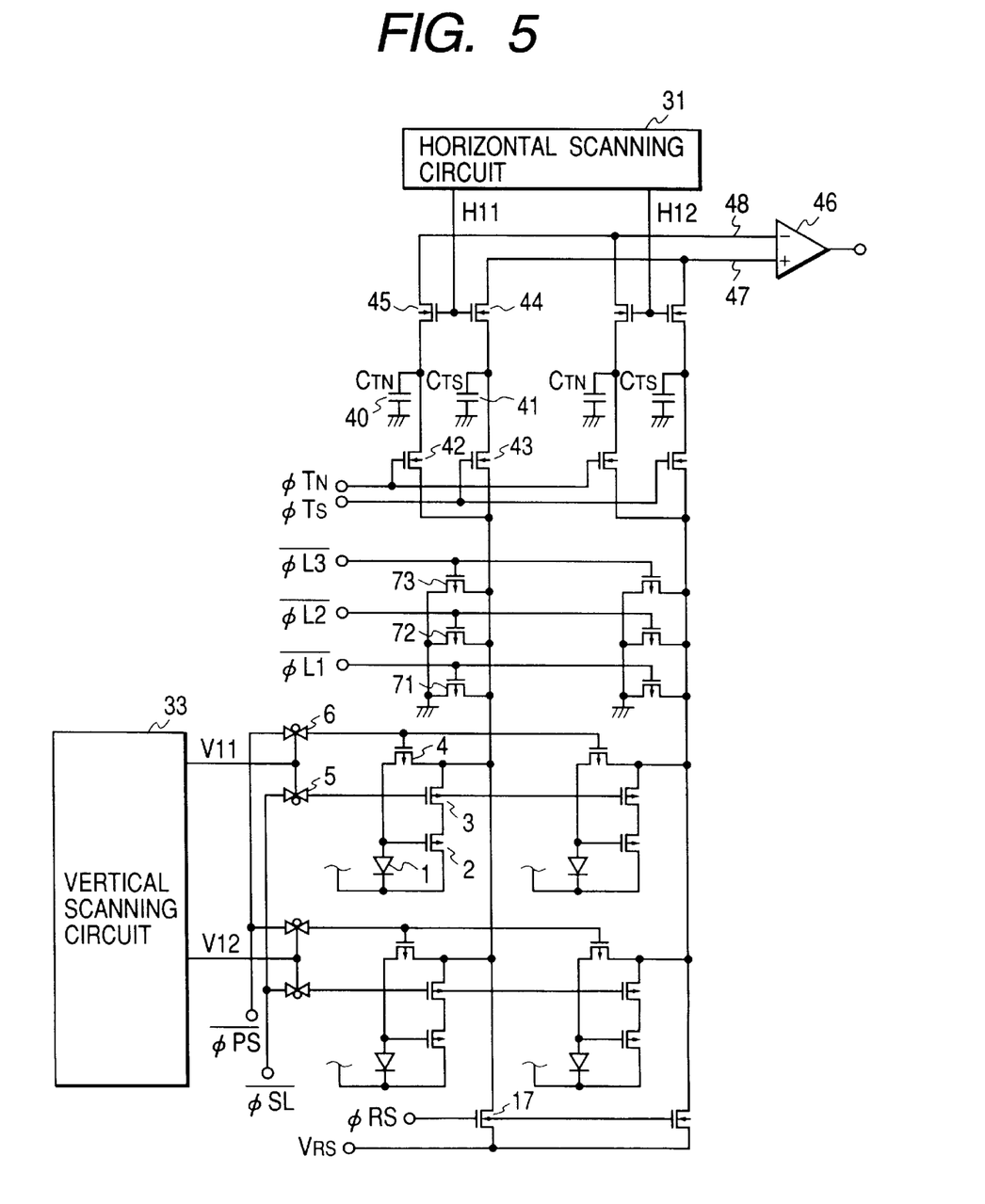
FIG. 5 is a circuit diagram of the third embodiment of the present invention.

FIG. 5 shows the third embodiment of the present invention. An inverting amplification CMOS sensor of this embodiment removes noise using not a memory cell but signal and noise storage capacitors.

In FIG. 5, the photoelectric conversion apparatus has a dark output potential storage capacitor $C_{TN}$ 40, a signal output storage capacitor $C_{TS}$ 41, a transfer MOS switch 42 for the dark output potential storage capacitor $C_{TN}$, a transfer MOS switch 43 for the signal output storage capacitor $C_{TS}$, transfer MOS switches 44 and 45 for outputting a signal to a signal line 47 and a noise line 48, respectively, and a differential amplifier 46 for subtracting the dark output from the signal. A photodiode 1, an amplification MOS transistor 2, a selection switch MOS transistor 3, and a reset MOS transistor 4 of a sensor cell S and load MOS transistors 71 to 73 of the sensor cell S are the same as those described in the second embodiment.

The read timing of this embodiment will be described. An image signal from the sensor cell is stored in the signal output storage capacitor $C_{TS}$ 41. Next, the noise component of the sensor cell itself is stored in the dark output potential storage capacitor $C_{TN}$ 40. The transfer MOS switches 44 and 45 are turned on in accordance with a read scanning signal H11 from a horizontal scanning circuit 31 to read out the charges to the output lines 47 and 48, respectively. An image signal from which the noise component has been removed can be obtained as an output from the differential amplifier 46.

In this embodiment as well, since several load MOS transistors are arranged, the gain can be changed. A load MOS transistor that minimizes FPN is determined in the wafer or chip state, and one of adjustment pulses φLS1 to φLS3 is applied to control the operation of the load MOS transistor in actual use.

In this embodiment, when a signal and a dark output can be read out using the same inverting gain, noise can be removed by the differential amplifier at the final stage. For this reason, the condition for noise removal in a memory cell, i.e., inverting gain $-1/G_T$ need not be satisfied. The inverting gain may be set to be $-1$, $-2$, or $-4$. Conventionally, charges are amplified in an external circuit. In this case, the signal is vulnerable to noise and cannot attain a high S/N ratio. In this embodiment, however, charges can be amplified in the sensor cell S of the pixel unit, so the signal is robust against noise, and a high S/N ratio can be obtained.

Figure 7:
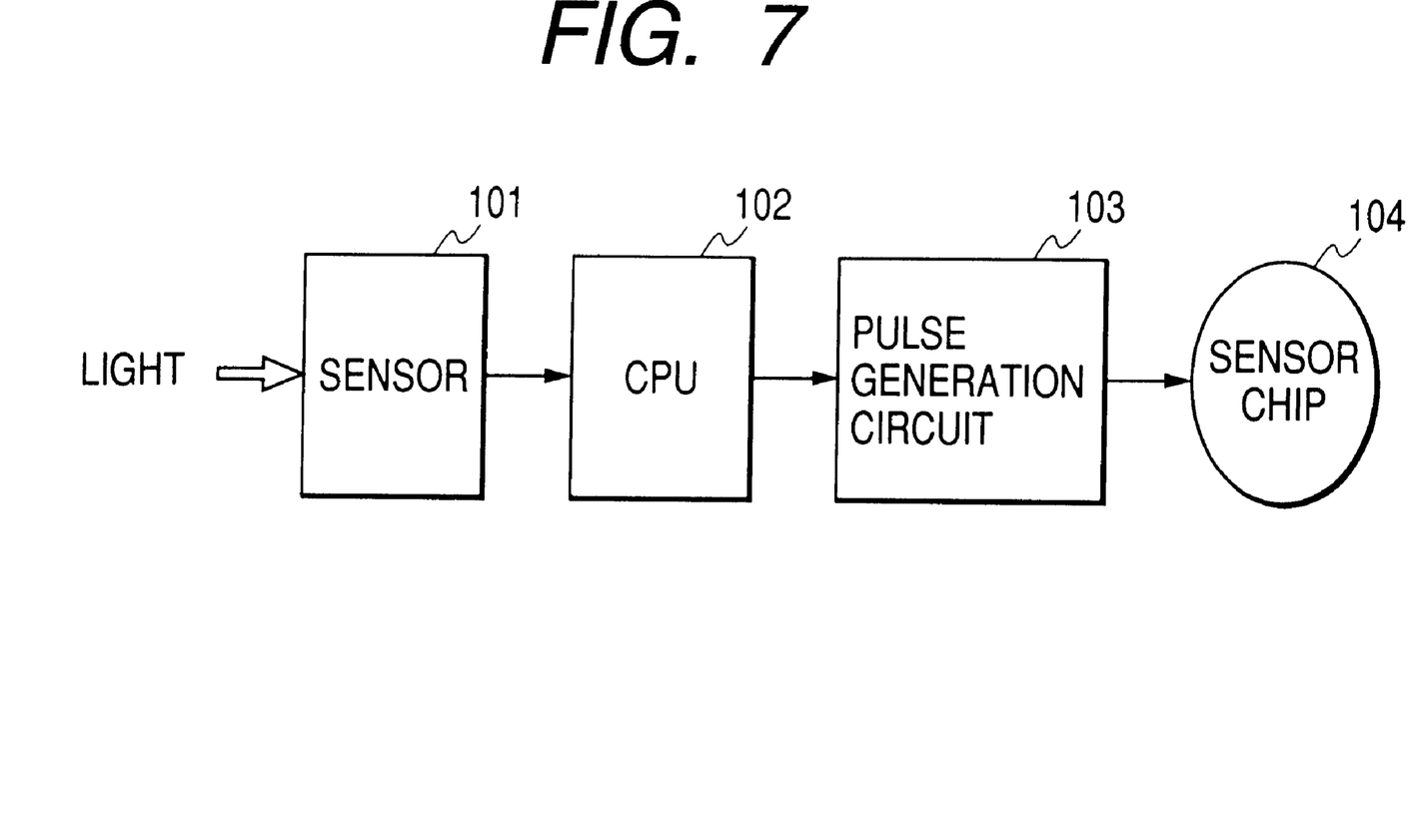
FIG. 7 is a selection control chart of a load MOS transistor in the third or fourth embodiment of the present invention.

In this embodiment, a gain variable photoelectric conversion apparatus which reads out a signal by increasing the gain in case of low illuminance and by decreasing the gain in case of high illuminance can be obtained. As shown in FIG. 7, the light amount is detected by a sensor 101, and a pulse generation circuit 103 is controlled by a CPU 102, thereby selecting a load MOS transistor in a sensor chip 104. A pn junction sensor or a photoconductive sensor can be used as a sensor for detecting the light amount.

In this embodiment, 2×2 pixels have been described. However, a signal can also be read out by a plurality of area sensors or a line sensor. In a line sensor, outputs V11 and V12 from a vertical scanning circuit 33 may always be set at "H"; the vertical scanning circuit 33 can be omitted.

Figure 6:
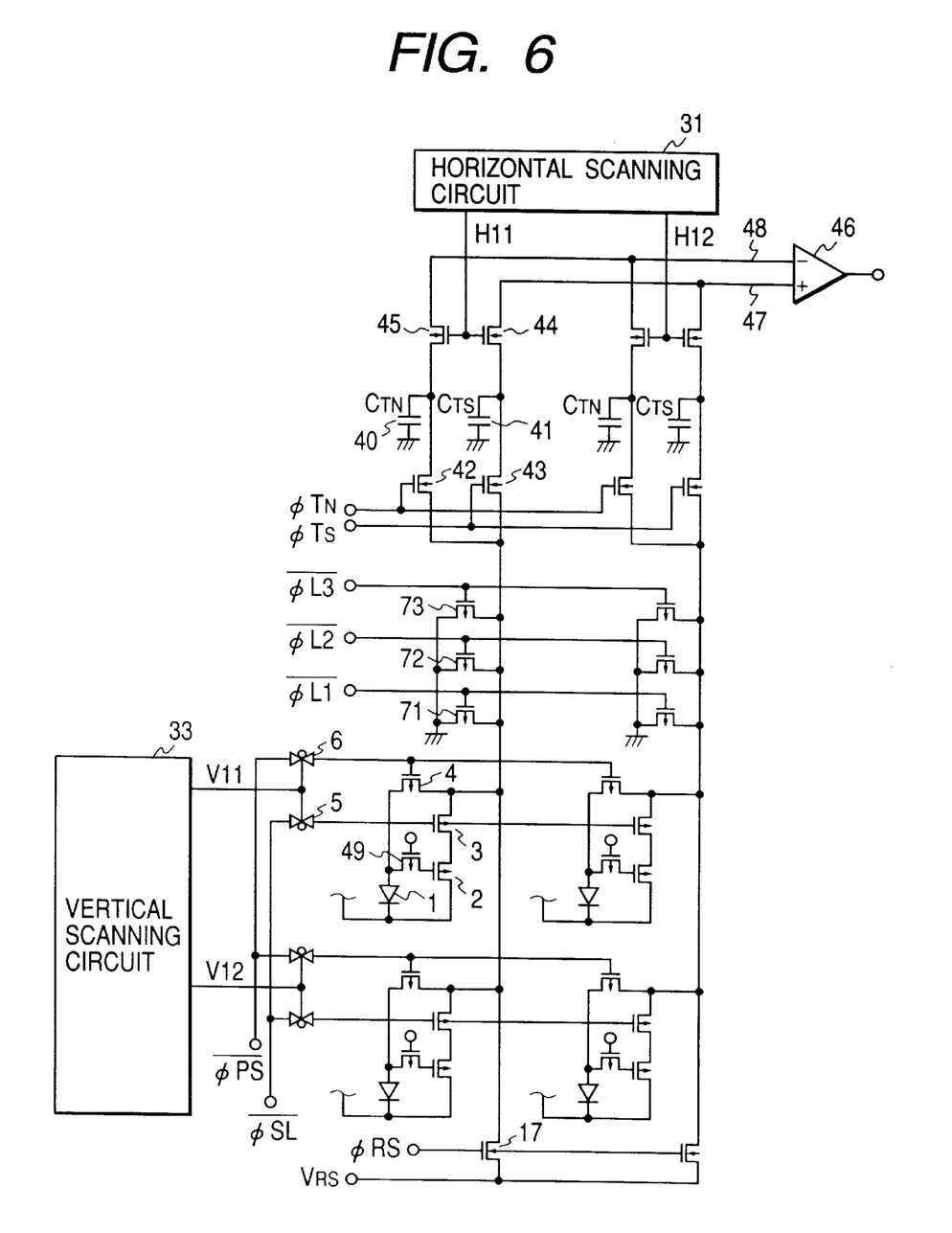
FIG. 6 is a circuit diagram of the fourth embodiment of the present invention.

FIG. 6 shows the fourth embodiment of the present invention. In this embodiment, the circuit arrangement is the same as that of the third embodiment, and the pixel arrangement is changed. In this embodiment, a transfer gate 49 is arranged between a photodiode 1 and an amplification MOS transistor 2, and charges generated in the photodiode 1 are completely depleted and transferred to the gate of the amplification MOS transistor 2. The gate potential changes due to the charges which are completely depleted and transferred. This change in potential is inverted and amplified to read out the signal. The present invention is characterized in that the inverting amplification gain can be changed by load MOS transistors 71 to 73, so FPN can be minimized.

According to this embodiment, a gain variable photoelectric conversion apparatus having a high S/N ratio and high sensitivity can be obtained. The functions and operations of remaining constituent elements are the same as those of the first to third embodiments.

In the above embodiments, a plurality of load MOS transistors are arranged to change the gain. These load MOS transistors can be manufactured following the same patterning process as that for other MOS transistors. In addition, an increase in area for the manufacture does not largely affect the chip size because the dedicated area also has a MOS structure.

As has been described above, according to the first or second embodiment, the inverting amplification gain is always set to be optimum. Since a signal free from noise can be obtained, the yield in terms of FPN is improved, and the cost can be reduced.

According to the third or fourth embodiment, the gain is set in correspondence with the light amount, so a photoelectric conversion apparatus having a high S/N ratio, high sensitivity, and a wide dynamic range can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus comprising:
   a plurality of pixels each including photoelectric conversion means and amplification means for amplifying charges generated in said photoelectric conversion means by amplification and outputting the charges to an output line;
   first storage means for storing noise signals generated in said pixels via said output line;
   second storage means for storing signals generated by photoelectric conversion in said photoelectric conversion means via said output line; and
   load means capable of switching characteristics and arranged on said output line.

2. An apparatus according to claim 1, wherein noise is removed by obtaining a difference between an output from said second storage means and an output from said first storage means.

3. An apparatus according to claim 2, wherein said load means comprises at least two loads having different characteristics and selection means for selecting one of said loads.

4. An apparatus according to claim 3, wherein said load comprises a transistor.

5. An apparatus according to claim 4, wherein said transistor comprises a MOS transistor.

6. An apparatus according to claim 5, wherein said selection means selects one of said loads by applying a pulse to a gate of said MOS transistor.

7. A photoelectric conversion apparatus comprising:

(A) pixels arranged two-dimensionally and connected to respective output lines on a plurality of pixels basis, each of said pixels including photoelectric conversion means, amplification means for amplifying a signal output from said photoelectric conversion means to output the amplified signal to the output line and pixel selection means for selectively outputting the signal output from said amplification means to the output line;

(B) load means provided to the output lines respectively;

(C) control means for controlling said pixel selection means so that said amplification means outputs the signal with a gain determined by said amplification means and said load means to the output line; and (D) adjustment means for adjusting the gain.

8. An apparatus according to claim 7, wherein a pixel of said photoelectric conversion means comprises a photodiode and a MOS transistor.

9. An apparatus according to claim 7, further comprising a memory cell constituted by a MOS transistor and a capacitor.

10. An apparatus according to claim 7, wherein said adjustment means controls characteristics of said load means.

11. An apparatus according to claim 7, wherein said photoelectric conversion means, said amplification means, and said load means are arranged on the same chip.

12. An apparatus according to claim 11, wherein said load means comprises at least two loads having different characteristics and selection means for selecting one of said loads.

13. An apparatus according to claim 12, wherein one of said loads, which minimizes noise of an output signal from said output line, is selected by said selection means and used.

14. An apparatus according to claim 12, wherein said load comprises a transistor.

15. An apparatus according to claim 14, wherein said transistor comprises a MOS transistor.

16. An apparatus according to claim 15, wherein said selection means selects one of said loads by applying a pulse to a gate of said MOS transistor.

17. A photoelectric conversion apparatus comprising:

a plurality of pixels each including photoelectric conversion means and amplification means for amplifying a signal output from said photoelectric conversion means to output the amplified signal to an output line;

a plurality of load means having different characteristics respectively and connected to said output line; and selection means for selecting one of said plurality of load means.

18. An apparatus according to claim 17, wherein one of said loads, which minimizes noise of an output signal from said output line, is selected by said selection means and used.

19. An apparatus according to claim 17, further comprising:

first storage means for storing noise signals generated in the pixels and provided through the output line; and second storage means for storing signals generated by photoelectric conversion in the pixels and provided through the output line.

20. An apparatus according to claim 17, wherein each of said plurality of load means comprises a transistor.

21. An apparatus according to claim 20, wherein said transistor comprises a MOS transistor.

22. An apparatus according to claim 21, wherein said selection means selects one of said plurality of load means applying a pulse to a gate of said MOS transistor.

23. An apparatus according to claim 17, wherein each of said plurality of load means comprises a transistor.

24. An apparatus according to claim 23, wherein said transistor comprises a MOS transistor.

25. An apparatus according to claim 24, wherein said selection means selects one of said plurality of load means by applying a pulse to a gate of said MOS transistor.

26. A photoelectric conversion apparatus comprising:

a plurality of pixels, each including photoelectric conversion means and amplification means for amplifying a signal output from said photoelectric conversion means and outputting the amplified signal;

load means provided in common to said plurality of pixels; and adjustment means for variable-adjustment of a gain which is determined according to said amplification means and said load means.

27. An apparatus according to claim 26, further comprising detection means for detecting an amount of light, wherein said adjustment means adjusts variably the gain according to an output of said detection means.

28. A photoelectric conversion apparatus comprising:

a plurality of pixels, each including photoelectric conversion means and amplification means for amplifying a signal output from said photoelectric conversion means and outputting the amplified signal;

load means provided in common to said plurality of pixels; and adjustment means for variable-adjustment of said load means, wherein the signal output from said photoelectric conversion means is amplified with a gain which is determined according to said amplification means and said load means, and the amplified signal is output.

29. An apparatus according to claim 28, further comprising detection means for detecting an amount of light, wherein said adjustment means adjusts variably said load means according to an output of said detection means.

* * * * *